Feb. 20, 1945. R. G. SARGEANT 2,369,859
SYSTEM OF AIRPLANE CONTROL
Filed July 20, 1940 2 Sheets-Sheet 1
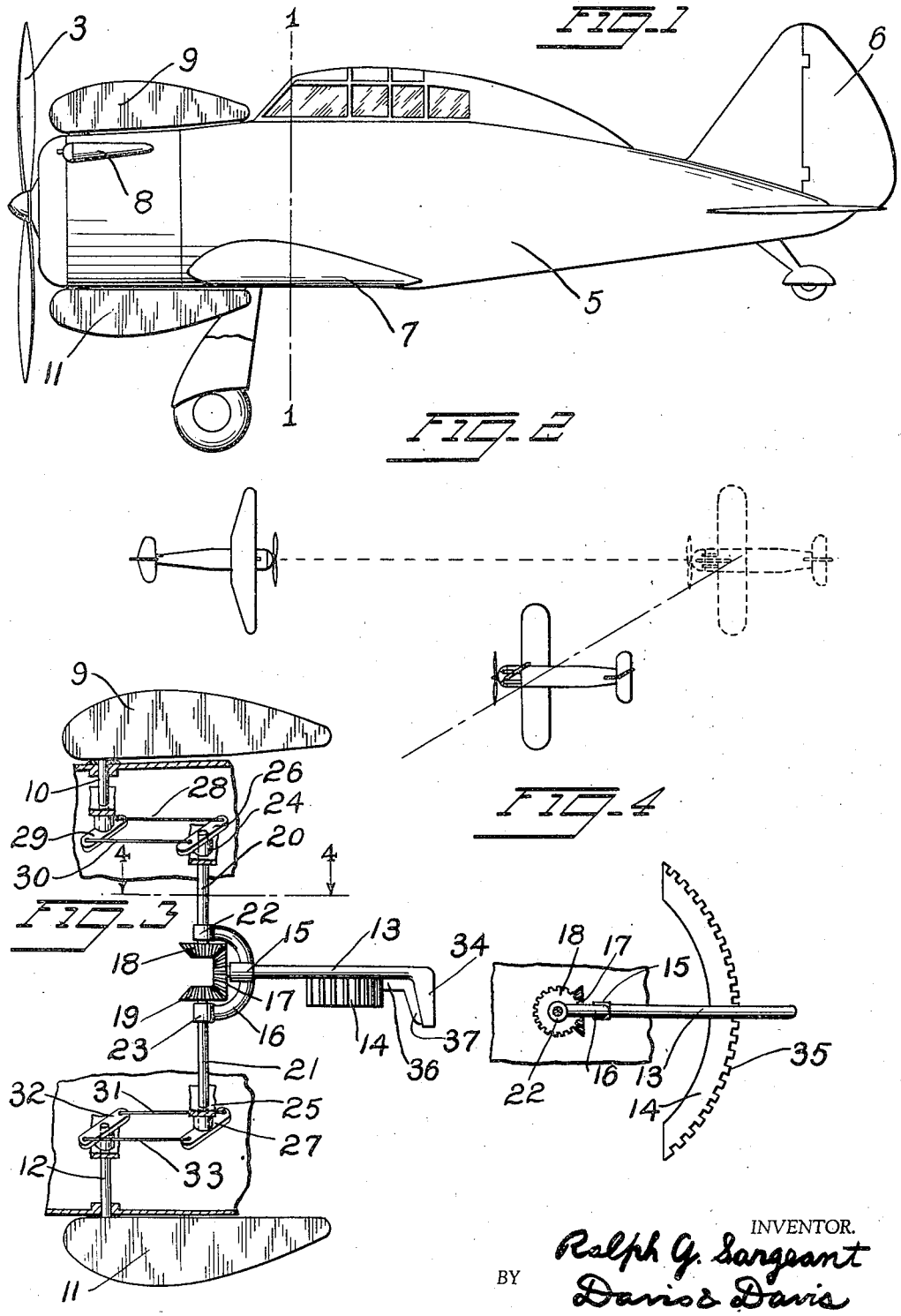
INVENTOR.
Ralph G. Sargeant
BY Davis & Davis
ATTORNEYS.

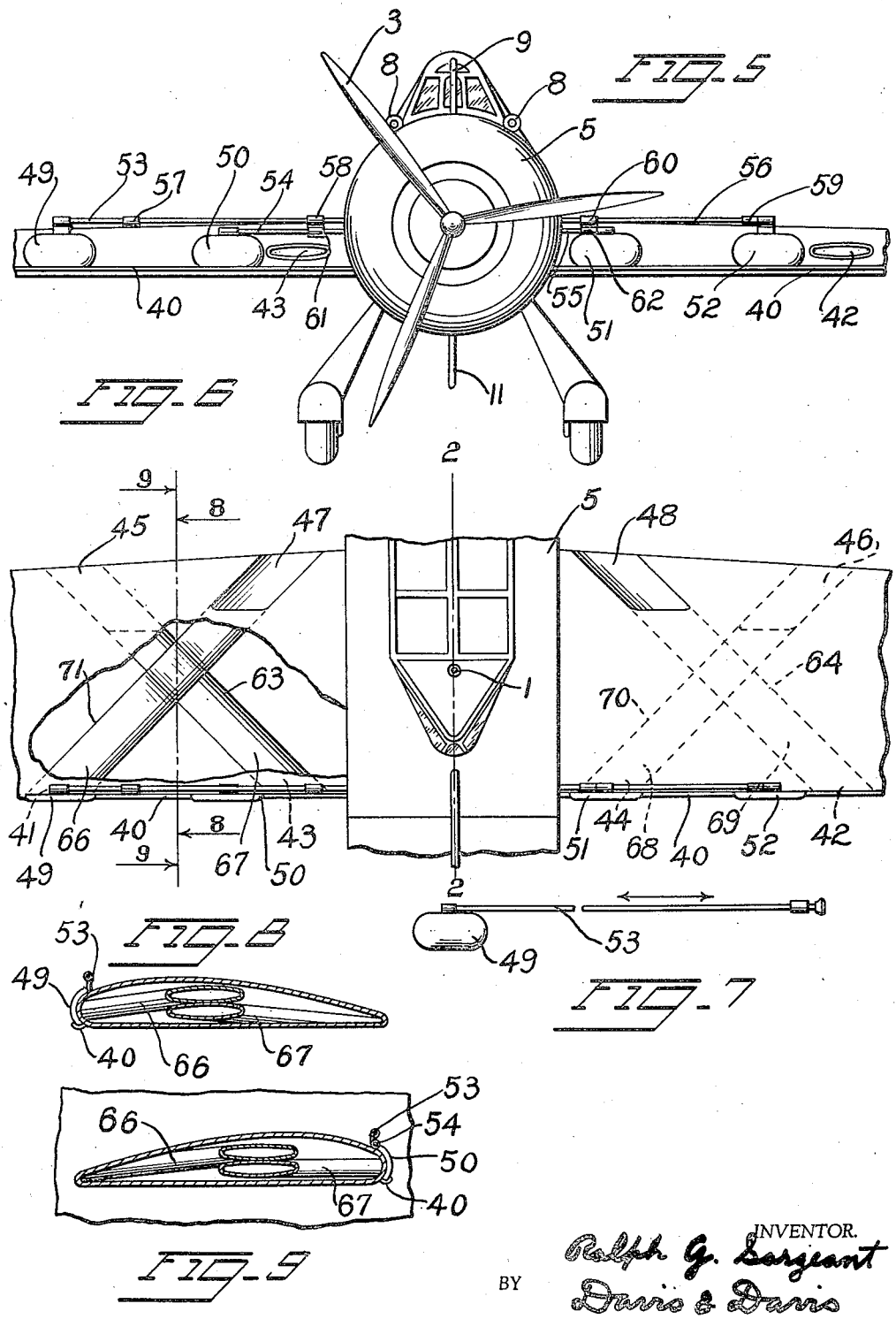

Patented Feb. 20, 1945

2,369,859

UNITED STATES PATENT OFFICE 2,369,859

SYSTEM OF AIRPLANE CONTROL

Ralph George Sargeant, Lakeland, Fla., assignor of one-half to Fred E. Saumenig, Woodlawn, Md.

Application July 20, 1940, Serial No. 346,629

5 Claims. (Cl. 89—37.5)

My invention relates to improved systems of airplane control and has for its object to provide improved means and methods whereby the pilot of an airplane may while maintaining a true flight direction cause at will the flight of the plane to veer or deviate parallel to the line of flight definitely either to one side or the other without changing the direction in which the nose of the plane is pointed.

Another object of the invention is to provide means and methods whereby the pilot of an airplane may be proper manipulation of the improved means provided in my present invention, cause the plane at will to move sidewards while retaining its longitudinal axis on a level path and its lateral axis on an even keel.

Another object of my invention is to provide a system of airplane control particularly adaptable in warfare to increase the maneuverability and efficiency of combat planes. Thus since it has been the common practice to place the weapons of warfare such as machine guns or cannons in the nose of a combat plane difficulty has been experienced in the past, because in order to keep such weapons trained on the enemy it has been necessary to keep the nose of the plane pointed in the direction of the opposing parties. However, since the pilot in maneuvering for position is often required to turn the airplane to either side of the enemy airplane; and in the past since it has been necessary in order to change the course of the airplane to turn the nose thereof in the direction of the desired flight; the weapons mounted in the nose of the said airplane must of necessity be turned from the enemy, in which position the said plane often presents a defenseless target of attack for the enemy. Therefore, it is an object of my invention to provide means whereby in changing direction of the flight of a combat plane it will not be necessary to also change the direction in which the nose of the plane is pointed. Further, even though it be desired to circle around the enemy the same may be accomplished by the proper manipulation of my invention so that the nose of the plane and the weapons mounted therein will be pointed in the direction of the enemy at all times. Thus, the plane may be maneuvered so as to keep the weapons mounted thereon trained on the enemy plane, and by the sideward movement of the said plane the same may be kept out of range of the weapons mounted in the nose of the opposing plane.

Another object of my invention is to provide means and methods for counteracting the involuntary side drift of an airplane due to wind pressure including means for counteracting the effect of cross winds on airplanes while landing, which might otherwise result in disastrous ground loops, particularly where the landing field is of limited space and a single runway is provided.

Another object of my invention is to provide a simple and effective safety means for assisting in the recovery of an airplane from a spin.

Another object of my invention is to provide an air resistance means and a simple mechanism for adjustably operating the same, whereby an effective means may be provided for arresting or slowing down the forward travel of an airplane while in flight or upon landing. Thus, the pilot of a combat plane in flight may, by the proper application of the air resistance braking means embodied in my invention increase the maneuverability of such plane and thereby present a more difficult target for the gun fire of the enemy. Moreover, in landing the plane, the same may be brought to a stop by the braking means embodied therein, in a considerably shorter distance than normally necessary.

A further object of my invention is to provide an operable braking means which may be applied independently to either the left or right wing of a plane, thereby arresting the forward travel of such wing and providing means for making a more positive turn to either the left or right depending upon the wing to which the braking means has been applied.

Other objects and advantages of my invention are set forth in the following description, taken with the accompanying drawings, and the novel features thereof are pointed out in the appended claims. The disclosure, however, is illustrative only, and I may make changes in detail especially in matters of shape, size and arrangement of parts within the principle of the invention to the full extent indicated by the broad and general meanings of the terms in which the appended claims are expressed.

On the drawings—

Figure 1 is a longitudinal side view of an airplane showing the forward guiding devices or front rudders embodied in my invention.

Figure 2 is a diagrammatic view illustrating the operation of my invention.

Figure 3 illustrates diagrammatically one form of control mechanism for operating the forward guiding devices illustrated in Figure 1.

Figure 4 shows a top view of Figure 3 taken along the lines 4—4 and looking in the direction of the arrows.

Figure 5 is a front elevation of an airplane with the ends of the wings broken away showing the forward guiding devices disclosed in Figure 1 and illustrating the inlet ports and the sliding valves for the aerodynamic passageways embodied in my invention.

Figure 6 is a top plan view of the forward wing disclosed in Figure 5 with a portion of the upper part of the said wing broken away showing the aerodynamic passageways embodied in my invention.

Figure 7 is a detailed view of the manually operable mechanism for adjustably opening and closing the ports of the said aerodynamic passageways.

Figure 8 is a cross sectional view of Figure 6 taken along the lines 8—8 and looking in the direction of the arrows 8—8.

Figure 9 is a cross sectional view of Figure 6 taken along the lines 9—9 and looking in the direction of the arrows 9—9.

On the drawings the same numerals indicate the same parts throughout.

The airplane as indicated generally in Figures 1 and 5 may be of any well known or approved type and hence will not be described in detail except in so far as pertains to my present invention, and for the same reason parts thereof not entering into or forming a part of or necessary to, a proper understanding of my present invention have not been illustrated.

For the better understanding of the principles of my invention, the line 1—1, Figure 1, represents the vertical axis about which the airplane would normally move in order to effect a change of direction and the line 2—2, Figure 6, represents the longitudinal axis of the airplane.

In the embodiment of my invention illustrated in Figure 1, the numeral 3 indicates the propeller; 5 the body of the plane; 6 the rear rudder or rear controlled surface area; 7 the forward wing of the said airplane and 8 a machine gun fixedly positioned in the nose of the plane so as to extend substantially parallel to the body thereof and pointing in a forwardly direction. The numeral 9 indicates the upper forward guiding device or controlled surface area or rudder which projects vertically upward and extends longitudinally along the engine nacelle. The said rudder 9 is positioned in front of the vertical axis 1—1 and above the center of gravity of the said airplane and immediately behind the propeller 3. The rudder 9 at the forward end thereof is pivotally mounted on the engine nacelle by the rudder post 10.

Positioned below the engine nacelle and in vertical alignment with the aforesaid upper forward rudder 9, is the lower forward guiding device or controlled surface area or rudder 11, which is positioned in front of the vertical axis 1—1 and below the center of gravity of the said airplane and similarly positioned immediately behind the propeller 3 of the plane. The lower forward rudder 11 is pivotally mounted on the lower engine nacelle by the rudder post 12, positioned at the forward end of the rudder 11.

Numeral 6 indicates the conventional rear rudder of the usual or approved type and the same is operated by separate means from the forward rudder controls. Such means may be any of the approved rear-rudder control mechanisms known in the art.

The control mechanism for the forward guiding devices may be arranged in various ways. In the simple arrangement illustrated in Figures 3 and 4 the steering shaft 13 has one end supported by the horizontally mounted arcuate member 14, and has the opposite end supported in the bearing sleeve 15 of the supporting frame 16. The said steering shaft 13 has secured at the latter end the bevel gear 17, which engages the bevel gears 18 and 19, which in turn are respectively fastened to the shafts 20 and 21, held in the bearing sleeves 22 and 23 respectively of the supporting frame 16. The opposite ends of the shafts 20 and 21 are journaled in the supporting members 24 and 25 respectively, and there is provided on the said shafts 20 and 21 the arms 26 and 27 respectively, which arms are adapted to move with the respective shafts to which they are attached.

The arm 26 is operatively connected with the forward upper rudder 9 by the cable 28 which leads from the right end of the arm 26 to the right end of the tiller 29 provided to turn the rudder post 10 and by the cable 30 which leads from the left end of the arm 26 to the left end of the tiller 29. The arm 27 is operatively connected with the forward lower rudder 11 by the cable 31 which leads from the right end of the arm 27 to the right end of the tiller 32 provided to turn the rudder post 11 and by the cable 33 which leads from the left end of the arm 27 to the left end of the tiller 32.

At the free end of the steering shaft 13, there is provided a handle 34. The steering shaft 13 as previously explained is supported by a horizontally mounted arcuate member 14 having provided a toothed rack 35 adapted to conveniently engage a suitable pawl 36 carried by the said handle 34. The said pawl 36 is held in engaging position with the toothed rack 35 under the tension of a spring provided in the handle 34 and the said pawl 36 is adapted to be conveniently disengaged from the said toothed rack 35 upon the pressure of the finger of the operator on the trigger 37.

It is readily apparent that upon swinging the steering shaft 13 laterally along the arcuate member 14 transverse to the connecting shafts 20 and 21 the bevel gear 17 will lock with the bevel gears 18 and 19 giving equal angular movement to the shafts 20 and 21, and thereby causing the upper and lower forward rudders to be pivoted in unison in the same direction at an equal angle.

Moreover, if the steering shaft 13 is turned by the handle 34 axially, the meshing of the gear 17 with the gears 18 and 19 will give a differential axial movement to the shafts 20 and 21 causing the upper forward rudder 9 to turn in one direction, and the lower forward rudder 11 to turn in the opposite direction. Of course, an axial movement of the steering shaft simultaneously with a lateral movement thereof will impart the compounded resultant of these two movements to the lower and upper forward rudders.

It is evident that since the upper and lower forward guiding rudders are positioned immediately behind the propeller 3 of the said airplane that due to the energy imparted by the blades, the pressure will rise immediately behind the airscrew disc. This pressure converts into kinetic energy, with increase of velocity and there is therefore a falling pressure away from the airscrew.

While the rear rudder 6 is positioned a greater distance from the vertical axis 1—1 than the forward rudders and therefore a greater leverage might be expected to be exerted by the air flow on the rudder 6, this greater leverage is materially offset by the air passing through the propeller disc resulting in a greater pressure of air force on the forward rudders 9 and 11 than on the rear rudder 6, since the rudders 9 and 11 are positioned immediately behind the air screw disc and in the slip stream.

It will then be apparent that if the pilot desires the aforesaid airplane to veer sidewards without changing the direction in which the nose of the plane is pointed, as illustrated diagrammatically in Figure 2, it is necessary only that the pilot pivot the forward rudders 9 and 11, and the rear rudder 6 in the same direction by the separate control means aforenoted, and adjust the same to the angular position at which the forces of the air flow on the control surfaces will be properly coordinated.

Thus for example with the trailing edges of the forward and rear rudders pivoted over to the left the forward flight of the plane would cause the force exerted by the air flow on the said control surfaces to move that part of the airplane in front of the vertical axis 1—1 of the said plane at an angle to the right and forward of the original course of flight, and that part of the airplane behind the said center of gravity at an equal angle to the right and forward of the original course of flight provided of course that the control surfaces aforenoted are adjusted by the pilot so that the forces exerted at the forward and rear control surfaces are substantially equal. The force set up by the air flow at any one of the said control surfaces may of course be regulated by the adjustment of the angularity of the control surface.

Moreover, since the forward rudders 9 and 11 are positioned respectively above and below the center of gravity of the said plane the forces set up by the air flow both above and below the center of gravity of the said plane are utilized, and thereby maintain in the sideward movement of the said plane previously described the lateral stability of the plane.

Moreover, in the sideward movement aforesaid, any difference between the force set up by the air flow on the control surfaces of the upper and lower rudders may by the pilot be conveniently adjusted by the axial movement of the steering shaft 11 in conjunction with the transverse movement as previously described. Thus, by moving the rudders differentially in opposite directions, the force set up by the air flow will be increased at one rudder and diminished at the other, thereby adjusting the difference in the force applied.

Correlated with the sideward movement described, it will be readily understood that the effects of a side wind may be conveniently overcome by the adjustment of the forward and rear rudders so that the sideward force of the plane will be exerted opposite to that of the side wind and equal in force.

Similarly, the effects of cross winds which have so often caused disastrous results in emergency and other landings may be counteracted by the use of the forward and rear rudders as described, so that there may be exerted by the plane a sideward force of equal intensity against that of the cross wind.

Further, the forward rudders may be used in conjunction with the rear rudder to more effectively counteract the effect of spinning in an airplane. In order to accomplish this it is necessary that the pilot turn the steering shaft axially so that the upper and lower forward rudders are pivoted in opposite directions with the rear edge of the upper and lower forward rudders being set in the direction of and against the spin to stop rotation of the plane. The rear rudder is likewise set against the spin and is pivoted in the same direction as the upper forward rudder.

A modified form of my invention is illustrated in Figures 5 to 9 inclusive, and has provided the forward and rear rudder arrangements, and the rudder control mechanisms substantially as previously shown and described.

In this latter form of my invention there are provided suitably mounted within the forward wing structure the aerodynamic passageways or controlled surface areas or tubes 66, 67, 68 and 69, extending diagonally across the wing chord between the leading and trailing edges of the said wing.

Provided within the forward wing structure at one side of the body 5 of the said plane are the passageways 66 and 67, while within the forward wing structure at the opposite side of the said plane are the passageways 68 and 69.

The passageways 66 and 68 are set at an acute angle to the longitudinal axis 2—2 of the said plane, and are so mounted that the said passageways extend in parallel relationship rearwardly to the right, while the passageways 67 and 69 are set at an acute angle to the longitudinal axis aforesaid, and extend in parallel relationship rearwardly to the left as shown in Figure 6. The purpose of this arrangement will appear hereinafter.

The passageways 67 and 68 extend along the inner lower edge of the said forward wing structure having the respective inlet posts 43 and 44 provided in the leading edge of the said forward wing and the outlet ports 45 and 46 provided in the lower edge of the forward wing structure substantially at the trailing edge of the said wing.

The passageways 66 and 69 extend along the inner upper edge of the said forward wing structure with the tube 66 crossing over the tube 67 and the tube 69 crossing over the tube 68. The passageways 66 and 69 have the inlet ports 41 and 42 respectively, provided in the leading edge of the said forward wing, and the respective outlet ports 47 and 48 provided in the upper edge of the said forward wing structure substantially at the trailing edge thereof. At the inlet ports 41, 43, 44 and 42 of the aerodynamic passageways 66, 67, 68 and 69 are provided respectively the sliding valves 49, 50, 51 and 52 suitably mounted on the track 40, provided on the leading edge of the forward wing as shown in Figures 5 and 6.

Any suitable mechanism may be employed for operating the valves 49, 50, 51 and 52 just described. I have shown in Figures 5 and 6 a simple operating structure comprising the push pull rods 53, 54, 55 and 56 for operating the valves 49, 50, 51 and 52 respectively. The push pull rod 53 is slidably mounted on the forward wing by the sleeve members 57 and 58, while the push pull rod 56 is slidably mounted on the forward wing at the opposite side of the body of the plane by the respective sleeve members 59 and 60. The sliding valves 50 and 51 have the sleeve members 61 and 62 respectively provided for slidably mounting the said push pull rods on the said wing.

By means of the aforesaid push pull rods, Figure 7, the said sliding valves may be conveniently moved so as to open and close the inlet ports to the aerodynamic passageways 66, 67, 68 and 69, and to regulate the size of the inlet opening whereby the air flow or pressure in the said tubes may be conveniently controlled.

As the forces developed in the passageways 66, 67, 68 and 69 are opposed to the direction in which the passageways extend, and tends to force the said tubes to a position parallel to the direction of the flight of the plane, the aerodynamic effect of the passageways 66 and 68 is to the left and opposite to the aerodynamic effect of the passageways 67 and 69, which is to the right. Accordingly, the two sets of passageways are referred to hereinafter as aerodynamically opposing passageways.

Thus, while in flight should the pilot slide the valves 50 and 52, as shown in Figure 6, so as to open the inlet ports to the passageways 67 and 69, the resultant air flow in the said tubes would set up a force directed to the right along the inner surface areas 63 and 64 of the respective tubes.

The controlled surface areas 63 and 64 extend in front of and behind the vertical axis of the said plane which for the purpose of illustration is indicated in Figure 6 by the numeral 1. The center of the pressure exerted on the plane by the air flowing along the controlled surface areas 63 and 64 would be substantially at or near the vertical axis 1 of the said plane and the said force would be exerted on the said plane toward the right. However, in order that the forces applied in the said tubes in front of and behind the vertical axis may be definitely equal both in front of and behind the vertical axis the forward upper and lower rudders 9 and 11, and the rear rudder 6 previously described are adapted to be adjusted so that the force applied by the air flow in front of the vertical axis and the force applied behind the vertical axis may be equal and the plane will accordingly move forward and sideward without changing the direction in which the nose of the plane is pointed.

A force in the opposite direction or to the left will obviously be set up along the inner controlled surface areas 71 and 70 of the respective tubes 66 and 68 by the opening of the inlet ports thereto.

Moreover, upon the opening of the inlet ports to the aerodynamically opposing passageways such as tubes 67 and 68, it will be readily apparent that since the forces set up will be in opposite directions that the same will have a braking effect upon the forward movement of the plane. By adjusting the air flow in the aerodynamically opposing passageways by means of the push pull rods the braking force may be conveniently regulated, and the plane slowed up while in flight. Moreover, after landing the plane the inlet ports to the aerodynamically opposing tubes may be adjustably opened and the plane brought to a stop within a much shorter distance than normally necessary, thereby providing means whereby emergency landings on small fields may be made with greater safety.

Further, the braking means may be applied at either side of the plane thereby increasing the maneuverability and enabling the pilot to make a sharper turn. Thus, for example, by opening the inlet ports to the passageways 66 and 67, retarding the plane at that side and turning the rear rudder in the direction of the retarded side, the plane would be pivoted on the retarded wing thereby enabling the pilot to make a much more positive turn than normally possible.

Although for purposes of illustrating the principle of my invention I have disclosed a specific construction, it will be understood that the same may be varied in accordance with engineering principles for various designs of wings and rudders without departing from the spirit of my invention, the scope of which is set forth in the appended claims.

Having thus described my invention, what I claim as my invention and desire to secure by Letters Patent is:

1. In an aircraft, the combination, comprising, a forwardly directed gun fixedly mounted on said aircraft, suitably mounted tubes having inner surface areas extending in front of and behind the vertical axis of the airplane, the said tubes being so disposed as to form two pairs of aerodynamically opposing passageways, one of the said pairs of aerodynamically opposing passageways being mounted in the wing structure at one side of the said airplane and the other pair of the said aerodynamically opposing passageways mounted in the wing structure at the opposite side of the said airplane, the said passageways extending from the leading edge of the said wing to the trailing edge thereof, and having inlet ports provided at the leading edge of the said wing and outlet ports provided at the trailing edge, the tubes of each pair of aerodynamically opposing passageways extend rearwardly in the said wing structure at an acute angle to the longitudinal axis of the said airplane, and at an angle to the other tube of the said pair, and each of the said tubes extend parallel to a corresponding tube in the pair of aerodynamically opposing passageways mounted in the wing structure at the opposite side of the said airplane, a rear rudder mounted behind the vertical axis of the airplane and manually operable means for controlling the said rear rudder, a second rudder mounted in front of the said vertical axis and positioned directly behind the propeller and extending vertically above the longitudinal axis of the said airplane, a third rudder mounted in front of the vertical axis aforesaid and positioned directly behind the propeller, and extending vertically below the longitudinal axis of the said airplane, a steering shaft having provided means for controlling the second and third rudders directly by transverse movement of the said shaft including means for holding the said shaft in adjusted position, and further means for differentially adjusting the second and third rudders by axial movement of the said shaft, a plurality of sliding valves mounted on the leading edge of the said wing structure adapted to open and close the inlet ports to the said passageways and independent manually operable means for controlling each of the said valves whereby the size of the inlet ports may be regulated and the force of the air flow in the said passageways thereby controlled, and said rudders arranged for balancing the aerodynamic forces applied in front and behind said vertical axis through said tubes, whereby controlled aerodynamic forces may be applied to the said airplane both in front of and behind the vertical axis thereof in such a manner as to cause the controlled sideward flight of the said airplane for effecting a lateral adjustment of said gun.

2. In an airplane control mechanism, the combination of a rear rudder mounted behind the vertical axis of the airplane, a second rudder mounted in front of the said vertical axis, and positioned directly behind the propeller, and extending vertically above the longitudinal axis of the said airplane, a third rudder mounted in front of the vertical axis aforesaid and positioned directly behind the propeller and extending vertically below the longitudinal axis of the said airplane, a steering shaft having provided means for controlling the second and third rudders as a unit for movement of said second and third rudders together in one direction independently of the rear rudder and including differential gear means for adjusting in opposite directions the relation of the second and third rudders whereby aerodynamic forces may be applied in front of and behind the vertical axis of the said plane in such a manner as to cause the controlled sideward flight of the said plane.

3. In a control mechanism for an aircraft, the combination, comprising, a rear rudder mounted behind the vertical axis of the aircraft, a second rudder mounted in front of the vertical axis, and extending vertically above the longitudinal axis of the aircraft, a third rudder mounted in front of the vertical axis aforesaid and extending vertically below the longitudinal axis of the aircraft, a manually operable control lever having provided means for adjusting the second and third rudders as a unit in one direction independently of the rear rudder, and including means for differentially adjusting in opposite directions the second and third rudders, whereby aerodynamic forces may be applied in front and behind the vertical axis of said aircraft in such a manner as to cause a controlled sideward flight of said aircraft.

4. In a control mechanism for an aircraft, the combination, comprising, a first controlled surface area provided at the rear of the vertical axis of the aircraft, a second controlled surface area provided in front of the vertical axis and above the longitudinal axis of the aircraft, a third controlled surface area provided in front of the vertical axis and below the longitudinal axis of the aircraft; a first operable control member having means for controlling the second and third surface areas as a unit so as to apply aerodynamic forces in one direction to said first and second surface areas, and said first control member including means for differentially controlling said first and second surface areas; and a second operable control member for controlling said first surface area, whereby aerodynamic forces may be applied in front and behind the vertical axis of said aircraft in such a manner as to cause a controlled sideward flight of said aircraft.

5. In an aircraft, the combination, comprising, a gun mounted on said aircraft, a first controlled surface area provided at the rear of the vertical axis of the aircraft, a second controlled surface area provided in front of the vertical axis and above the longitudinal axis of the aircraft, a third controlled surface area provided in front of the vertical axis and below the longitudinal axis of the aircraft; a first operable control member having means for controlling the second and third surface areas as a unit so as to apply aerodynamic forces in one direction to said first and second surface areas, and said first control member including means for differentially controlling said first and second surface areas; and a second operable control member for controlling said first surface area, whereby aerodynamic forces may be applied in front and behind the vertical axis of said aircraft in such a manner as to cause a controlled sideward flight of said aircraft for effecting a lateral adjustment of said gun.

RALPH GEORGE SARGEANT.